(12) United States Patent
Chakrabarti et al.

(10) Patent No.: US 6,336,112 B2
(45) Date of Patent: Jan. 1, 2002

(54) METHOD FOR INTERACTIVELY CREATING AN INFORMATION DATABASE INCLUDING PREFERRED INFORMATION ELEMENTS, SUCH AS, PREFERRED-AUTHORITY, WORLD WIDE WEB PAGES

(75) Inventors: Soumen Chakrabarti, Maharashtra (IN); Byron Edward Dom, Los Gatos, CA (US); David Andrew Gibson, Berkeley, CA (US); Prabhakar Raghavan, Saratoga, CA (US); Sridhar Rajagopalan, San Jose, CA (US); Shanmugasundaram Ravikumar, San Jose, CA (US); Andrew Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/811,108

(22) Filed: Mar. 16, 2001

Related U.S. Application Data

(63) Continuation of application No. 09/143,733, filed on Aug. 29, 1998.

(51) Int. Cl.$^7$ ............................................... G06F 17/30
(52) U.S. Cl. ............................................... 707/5; 707/2
(58) Field of Search .......................... 707/2, 5, 6, 532; 342/378; 704/9

(56) References Cited

U.S. PATENT DOCUMENTS

| | | | |
|---|---|---|---|
| 5,619,709 A | * | 4/1997 | Caid et al. ..................... 704/9 |
| 5,794,178 A | * | 8/1998 | Caid et al. ..................... 704/9 |
| 6,101,344 A | * | 8/2000 | Wax et al. ..................... 342/378 |
| 6,112,202 A | * | 8/2000 | Kleinberg ....................... 707/5 |
| 6,112,203 A | * | 8/2000 | Bharat et al. ................... 707/5 |
| 6,134,541 A | * | 10/2000 | Castelli et al. ................. 707/2 |

OTHER PUBLICATIONS

Dongxin Xu et al. (IEEE publication) A principle component network for generalized eigen–decomposition; Neural Networks Proceedings 1998, pp. 849–853, vol. 2 (May 1998).*

* cited by examiner

*Primary Examiner*—Diane D. Mizrahi
(74) *Attorney, Agent, or Firm*—John L. Rogitz

(57) ABSTRACT

A method for cataloging, filtering and ranking information, as for example, World Wide Web pages of the Internet. The method is preferably implemented in computer software and features steps for enabling a user to interactively create an information database including preferred information elements such as preferred-authority World Wide Web pages. The method includes steps for enabling a user to interactively create a frame-based, hierarchical organizational structure for the information elements, and steps for identifying and automatically filtering and ranking by relevance, information elements, such as World Wide Web pages for populating the structure, to form, for example, a searchable, World Wide Web page database. Additionally, the method features steps for enabling a user to interactively define a frame-based, hierarchical information structure for cataloging information, identifying a preliminary population of information elements for a particular hierarchical category arranged as a frame, based upon the respective frame attributes, and thereafter, expanding the information population to include related information, and subsequently, automatically filtering and ranking the information based upon relevance, and then populating the hierarchical structure with a definable portion of the filtered, ranked information elements.

13 Claims, 13 Drawing Sheets

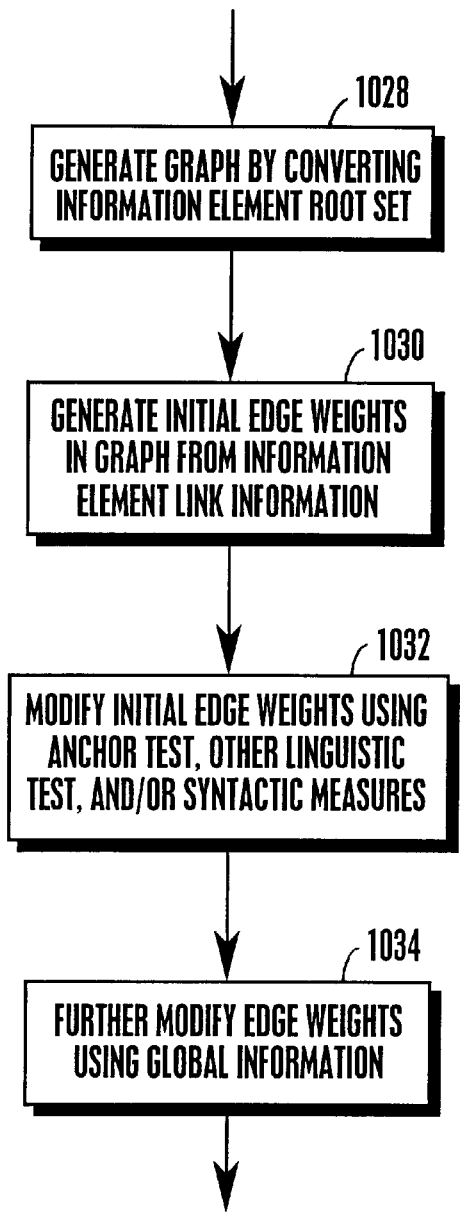
Figure 16
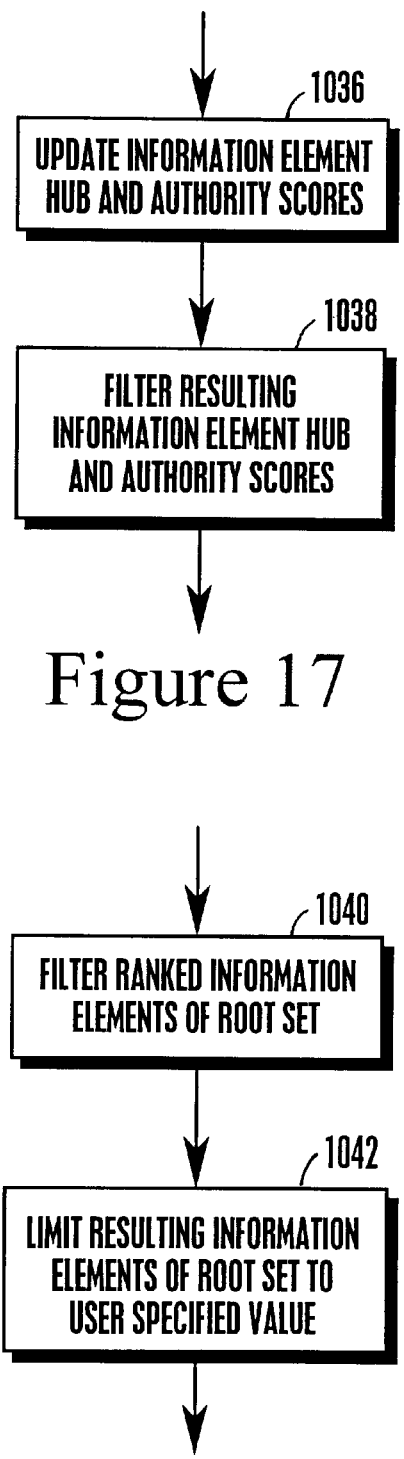
Figure 17
Figure 18

METHOD FOR INTERACTIVELY CREATING AN INFORMATION DATABASE INCLUDING PREFERRED INFORMATION ELEMENTS, SUCH AS, PREFERRED-AUTHORITY, WORLD WIDE WEB PAGES

This application is a continuation of application Ser. No. 09/143,733 filed Aug. 29, 1998, from which priority is claimed.

BACKGROUND OF THE INVENTION

1. Field of Use

This invention relates generally to a method for cataloging, filtering and ranking information;, as for example, World Wide Web pages of the Internet; and more particularly, to a method preferably implemented in computer software for interactively creating an information database including preferred information elements such as preferred-authority World Wide Web pages, the method. including steps for enabling a user to interactively create a frame-based, hierarchical organizational structure for the information elements, and steps for identifying and automatically filtering and ranking by relevance, information elements, such as World Wide Web pages for populating the structure, to form, for example, a searchable, World Wide Web page database; the method featuring steps for enabling a user to interactively define a frame-based, hierarchical information structure for cataloging information, identify a preliminary population of information elements for a particular hierarchical category arranged as a frame, based upon the respective frame attributes, and thereafter, expand the information population to include related information, and subsequently, automatically filter and rank the in formation based upon relevance, and then populate the hierarchical structure with a definable portion of the filtered, upper-ranked information element, in the case of World Wide Web pages, the method features steps for enabling a user to interactively establish a hierarchical database structure having frames defined as categories of information of user interest, searching for and collecting a preliminary population of Web pages of interest based upon the respective frame attributes of the hierarchy, subsequently expanding the population based upon links either actual or virtual associated with the pages, followed by filtering and ranking the pages based upon the relevance of the pages derived from the authority of the links, and thereafter, limiting the population to desired number of upper-ranked pages.

2. Related Art

The computer revolution has spawned so much information, that it is now to the point where the amount of information available on most subjects is typically so large as to create the new and associated problems of going through that wealth of information and selecting from it the specific pieces of information most relevant to the question at hand.

For example, in the case of the Internet's World Wide Web, if one were looking for information concerning something as straightforward as the restoration of an old car, there would likely be hundreds, if not thousands, of potential Web sites having as many if not more pages of information related to the subject. Accordingly, one faced with the problem of developing information on the subject of automobile restoration, would potentially be required to locate and go through literally hundreds of Web pages in an attempt to find those few most suited to his needs.

In the past, the World Wide Web's approach to this problem has been to provide so-called search facilities such as Yahoo!®. and others, to assist Web users in finding the information, i.e., Web pages, they might be looking for. However, search facilities such as Yahoo! typically only provide general organizations of Web subject matter and associated Web pages, those organizations being arranged as categories of Web subject matter that are based on the subjective points of view of the individuals who compile the information for the respective search facilities, or the points of view of the respective providers of the search facilities, or the points of view of the Web information providers, or some combination of all of these points of view. As a result, such Web subject matter organizations are susceptible to over inclusion and under inclusion of information which effects the accuracy and ease-of-use of the respective search facilities.

Still further, such search facilities, typically, are unable to group the information elements they return i.e., pages, by their respective "authoritativeness" that is, the degree to, which others have referred to the respective elements, i.e., pages, as sources information on the subject matter in question. Pages that have many references pointing to them are termed herein "authorities." On the other hand, pages that themselves point to many authorities can be referred to as "hubs."

While some workers in the field of information retrieval have noted the importance of "links" between hub and authority information elements such as Web pages, and computation of their respective authoritativeness weights, none have proposed systems or methods for enabling a user to interactively create an information databases of preferred-authority data elements such as Web pages, or, procedures for removing spurious factors that arise during computation of the authoritativeness weights for the respective pages.

With regard to the accuracy of authoritativeness computation, workers in the field have found that the computational accuracy is adversely affected by such factors as "self-promotion", "related-page promotion", "hub redundancy", and "false authority." Particularly, it has been found that during authoritativeness, computations pages with links to other pages of the same Web site can improperly confer authority upon themselves, thus giving rise to false promotion, i.e., "self-promotion," and adversely affect authoritativeness computation accuracy. Further, it has been found that in addition to "self-promotion", related pages from the same Web site, as for example, a home page and several sub-pages of the home page, can improperly accumulate authority weights, giving rise to false promotion in the form of "related-page promotion", which again adversely affect authoritativeness computation accuracy. Still further, workers have found that the value of a hub page resides in the links that it processes, and not, typically, the content of the page. Accordingly, where all the links of a hub page can be found in "better" hub pages, i.e., hub pages having a greater number of relevant links, inclusion of the first hub page gives rise to "hub redundancy" which unnecessarily burdens computation. And, still further, it has been found that certain pages pertaining to a number of unrelated topics, e.g., pages of resource compilations, typically refer to, i.e., are linked to a number of other pages, and accordingly appear as if they are "good hubs" even though many of the associated links point to pages of unrelated subject matter. This in turn causes the relevant links from the same page to become "false authorities", which, once again, adversely affecting accuracy of authoritativeness computation.

For example, J. Kleinberg in his U.S. patent application entitled: "Method and System for Identifying Authoritative Information Resources in an Environment with Content-based Links Between Information Resources", Ser. No. 08/813,749, filed Mar. 7, 1997 now U.S. Pat. No. 6,112,202 and assigned to the assignee of the current application, describes a method for automatically identifying the most authoritative Web pages from a large set of hyperlinked Web pages. More specifically, Kleinberg explains his method applies to the case where, for example, one has a page whose content is of interest, and desires to find other pages which are authoritative with respect to the content of the page of interest. However, while Kleinberg notes his method includes steps for conducting a search based upon a query composed from the content of the page of interest; steps for, thereafter, expanding the group of pages initially retrieved with pages that are linked to the pages initially retrieved; and finally, steps for iteratively computing the authoritativeness of the pages retrieved based upon the "weights" for the respective page link structures, his method fails to consider the interactive creation by a user of a database structure for the information, or optimization of the authoritativeness computation by removal of spurious of factors which adversely effect accuracy.

Likewise, S. Chakrabarti et al. in their U.S. patent application entitled, "Method and System for Filtering of Information Entities", Ser. No. 08/947,221 filed Oct. 8, 1997 now pending, also assigned to the assignee of the current application, describes a method for determining the "affinity" of information elements, the method including steps for first obtaining an initial set of information elements, thereafter, steps for expanding the initial set with "related" information elements, and subsequently, iteratively computing the relative affinity for the respective information elements, However, as in the case of Kleinberg, Chakrabarti et al. fails to consider or describe facilities for enabling a user to interactively create a database structure for the information, or optimization of the "affinity" computation by removing spurious factors which adversely effect accuracy.

SUMMARY OF THE INVENTION

Accordingly, it is an object of the present invention to provide a method for cataloging and ranking information.

Additionally, it is an object of the present invention to provide a method for interactively creating and/or modifying an information database including preferred information elements such as preferred-authority, World Wide Web pages.

Further, it is an object of the present invention to provide a method for improving the determination of authoritativeness amongst related information elements such as hyperlinked, World Wide Web pages.

Yet further, it is an object of the present invention to provide a method for improving the determination of authoritativeness amongst related information elements such as Web pages by the filtering spurious factors which adversely effect accuracy.

Still further, it is an object of the present invention to provide a method for enabling a user to interactively develop a personalized database structure for information organized in accordance with the user preferences, which may be subsequently populated with preferred-authority information elements such as hyperlinked, World Wide Web pages collected by the user.

Yet additionally, it is also an object of the present invention to provide a method for enabling a user to interactively develop a database of preferred-authority information elements, which database may be subsequently searched conveniently and efficiently to identify information elements such as World Wide Web pages of preferred-authority.

Briefly, to achieve at least one of the above and other objects and advantages, the method of the present invention includes steps for enabling a user to interactively create and/or modify an information database featuring a hierarchical, frame-based, organizational structure of the user's selection for receiving information elements, such as World Wide Web pages, also of the user selection. Further, the method features steps for enabling the identification of information elements, such as Web pages, having preferred-authority as determined by improved, automated computation of the link structure between information elements.

In the interest of simplicity, and to assist understanding, in the following discussion and throughout the specification, usage of the more specific terms "page(s)" and "Web site(s)" will be employed to include, and understood to embrace, respectively, the more general terms "information element (s)" and "information source(s)" unless otherwise expressly stated.

With the above thought in mind, it is to be noted that in preferred form, the method of the present invention is implemented in computer software suitable to be run on a conventional personal computer having a central processing unit, associated RAM, ROM and disk storage memory, and accompanying input-output devices, such as keyboard, pointing device, display monitor and printer. In preferred form the method includes program steps for facilitating generation of a display at, for example, the computer monitor, the display featuring an interface for enabling a user to interactively compose and/or modify an adjustable, frame-based, hierarchical organizational structure representing an arrangement of topics of the user's design. In accordance with the invention, the user formulates the frame-based organization structure to receive information elements, such as World Wide Web pages, which the users may subsequently select to populate the various frames of the organizational structure based on the respective frame attributes, i.e. descriptive features. In preferred form, the interface includes one or more screens respectively having multiple partitions for presenting: a graphical representation of the frame-based, hierarchical information structure of the user's creation; the Web pages contained in the category frames of the structure; and the components employed in selecting the Web pages for populating the frames. More particularly, the interface features graphical presentation of the frame-based hierarchical information structure, together with associated tools for freely navigating and modifying the structure; for example, by adding, deleting or moving frames within the structure to represent the tastes and preferences of the user. Additionally, the interface includes partitions for displaying the Web pages associated with a user-selected frame of the organizational structure, together with tools for manipulating and managing the pages included at the frame. And, still further in preferred form, the interface includes partitions and associated tools for enabling the user to view respective Web page content, such as page links, associated with selected frames, and the frame attributes used as query terms for initiating automated generation of preferred-authority, Web pages for populating the frames of the organizational structure.

Further, in preferred form, computation of Web page authoritativeness is undertaken, by defining Web page and associated link structure as including hub pages, and authority pages, wherein a hub page, "points to", i.e., links to, one or more authorities pages, and an authority page, is "pointed to", i.e. linked to, by one or more hub pages. Further, the method includes steps for constructing a root set of information Web pages likely to be relevant to a topic selected by the user. The root set is developed by first generating an initial set of Web pages with the use of a conventional query derived from the attributes of the category frame for the database hierarchical organizational structure the user is interested in populating, the query so derived, thereafter, being applied in conventional fashion against the World Wide Web. Further, the method includes steps for, subsequently, expanding the initial set of Web page returned responsive to the query, to include page elements directly linked to the Web pages of the initial set, thus forming the root set.

Following creation of the root set, the method includes steps for associating a hub-weight parameter and authority-weight parameter for each Web page, and iteratively calculating the authoritativeness of the respective pages of the root set based on the resulting, respective, hub-weight and authority-weight values for each page.

In accordance with the invention, the method additionally features steps for improving computational accuracy of the authoritativeness for the Web pages. Specifically, the method features steps executed during the computation of authoritativeness for filtering spurious computational factors such as "self-promotion", "related-page promotion", "hub redundancy", and "false authority." In preferred form, the method includes steps for filtering "self-promotion" from the computation, the steps including the discarding of links between pages, from the same Web site. Further, the method includes steps for filtering "related-page promotion" from the computation, which steps include "re-packing" the Web pages, for any Web site, having multiple pages showing non-zero authority, during which re-packing, all authorities other than the largest authority is set to zero.

Still further, the method in preferred form also includes steps for filtering "hub redundancy", the steps including identifying the highest weight, i.e., "best", hub during computation, zeroing the authority values of all pages pointed to by that hub, re-computing hub values, and, subsequently, recalculating authoritativeness. And, yet additionally the method in preferred form includes steps for filtering "false authority", the steps including: allowing each link in a Web page to have its own hub value; incrementing the authority value of the destination page with the hub value of the link when authority values are calculated; and re-computing the hub values of the original hub page with the authority value of the destination page, and accordingly, by a spreading function, the hub values of neighboring links. As will be appreciated, this makes the final hub value of the page, therefore, the integral of the hub values of its links.

Still further, in preferred form, the method in accordance with the invention includes steps for ranking the pages of the root set based on authoritativeness following computation of page hub and authority weights, and to thereafter, truncate the root set to a number of highest ranking pages prescribed by the user.

DESCRIPTION OF THE DRAWINGS

The above and further objects, features and advantages of the invention will become apparent, from the following more detailed description when read with reference to the accompanying drawings in which:

FIG. 16 is a flow diagram illustrating the more specific steps associated with the "Generate Weights For Information Elements" of FIG. 15, FIG. 15 itself illustrating the "Rank Information Elements Of Root Set" step of FIG. 12, FIG. 12 itself illustrating the "Populate Selected Frame With Information Elements" general step of the method in accordance with the present invention illustrated in FIG. 9;

FIG. 17 is a flow diagram illustrating the more specific steps associated with the "Determine Information Element Authority And Hub Scores" of FIG. 15, FIG. 15 itself illustrating the "Rank Information Elements Of Root Set" step of FIG. 12, FIG. 12 itself illustrating the "Populate Selected Frame With Information Elements" general step of the method in accordance with the present invention illustrated in FIG. 9; and FIG. 18 is a flow diagram illustrating the more specific steps associated with the "Truncate Ranked Information Elements" step of FIG. 12, FIG. 12 itself illustrating the "Populate Selected Frame With Information Elements" general step of the method in accordance with the present invention illustrated in FIG. 9.

DETAILED DESCRIPTION OF THE PREFERRED EMBODIMENT

The method of the present invention overcomes problems found in prior approaches to organization and retrieval of information, as for example, pages of the World Wide Web, by providing a method for cataloging, filtering and ranking information, and, particularly, Web pages. More specifically, the method is preferably implemented in computer software suitable for being run on a conventional personal computer and includes steps for enabling a user to interactively create and/or modify an information database featuring a hierarchical, frame-based, organizational structure of the user's selection for receiving information elements, such as World Wide Web pages, also of the user selection. Further, the method features steps for enabling the identification of information elements, such as Web pages, having preferred-authority as determined by improved, automated computation of the link structure between information elements.

As will be appreciated by those skilled in the art, while the invention has application to use by individuals for creating personalized, preferred-authority, e.g., high-authority, information databases, which may be developed from information sources such as the World Wide Web, in which the user can tailor the information organization to his tastes, the invention also has application to broad, business applications, not only for commercially cataloging information sources such as the World Wide Web, and providing facilities for distilling information retrieved to the higher levels of authority, but also, to such applications as building preferred-authority databases for use in law, medicine, engineering and other fields.

Figure 9:
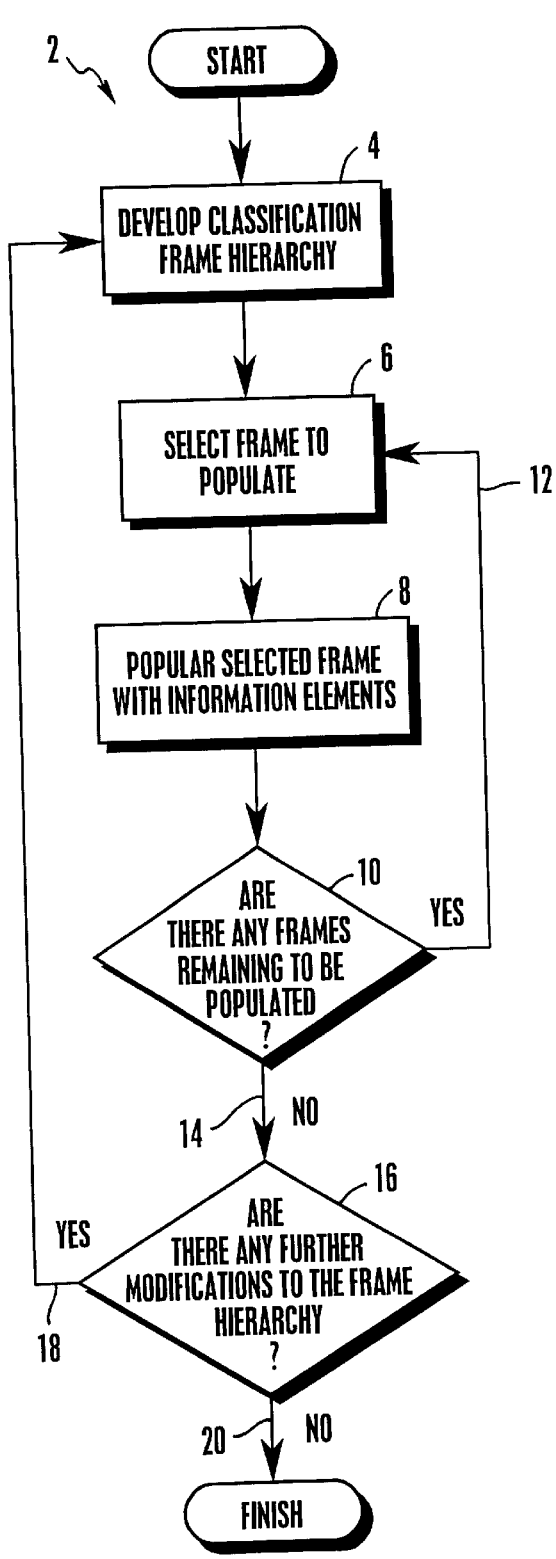
FIG. 9 is a flow diagram illustrating the general steps of the method in accordance with the present invention.

The method in accordance with the present invention is shown in its general aspect at FIG. 9. As shown there, method 2 is seen to broadly include step 4 for enabling a user to develop a personalized, frame-based, hierarchical information classification structure for the database. Further, following developments of the frame-based, hierarchical, information classification structure at step 4, method 2 is seen to include step 6 for enabling the user to select the information frame from the classification hierarchy he wishes to populate with information elements, e.g., Web pages.

Following user selection of the hierarchical classification frame to be populated, at step 6, method 2 includes step 8 for enabling the automated retrieval of information elements, e.g., Web pages, from the information source, e.g., the Web, for populating the selected frame. Thereafter, method 2 includes step 10 for prompting the user to indicate whether there are any other frames in the information classification hierarchy the user would like to populate with information. If the user indicates there are additional frames of the classification hierarchy to be populated, method 2 returns at branch 12 to select frame step 6, where the user is again permitted to designate a frame to be populated, followed by subsequent transition to step 8 for enabling automated retrieval of information for the newly selected frame.

As will be appreciated, the noted sequence of frame selection at step 6, automated population of the frame at step 8, and query at step 10 as to whether any frames remain to be populated with information, would continue until the user has designated all the frames he wishes to populate.

Once all the frames the user wishes to populate have been exhausted, method 2 advances over program-flow branch 14 to step 16, where the user is prompted to indicate whether there are any modifications of the information classification frame hierarchy which the user would like to undertake. In the case where the user would like to make changes to the classification structure, as for example, the addition, deletion or movement of any frames, method 2 would advance over program-flow branch 18 back to classification developments step 4, at which the user would be enabled to enter desired modifications to the information classification organizational structure.

Thereafter, and to be appreciated by those skilled in the art, following entry of all in a desired modifications to the information classification structure, method 2 program flow would again advance through method steps 6, 8, 10, 12 to enable population of modifications to the information classification frame structure as described above.

Finally, following information population of any modifications to the classification frame structure, the user, at step 16, would again be prompted to indicate whether any further changes to the classification structure were desired. If not, method 2 would advance over program-flow branch 20 to finish.

As to be appreciated, and as noted above, the method of the present invention has application to a broad range of information sources. However, for the sake of clarity and simplicity, and with no sense of limitation, the following more detailed description of method 2 will be undertaken with reference to the World Wide Web and the information pages available there.

Figure 1:
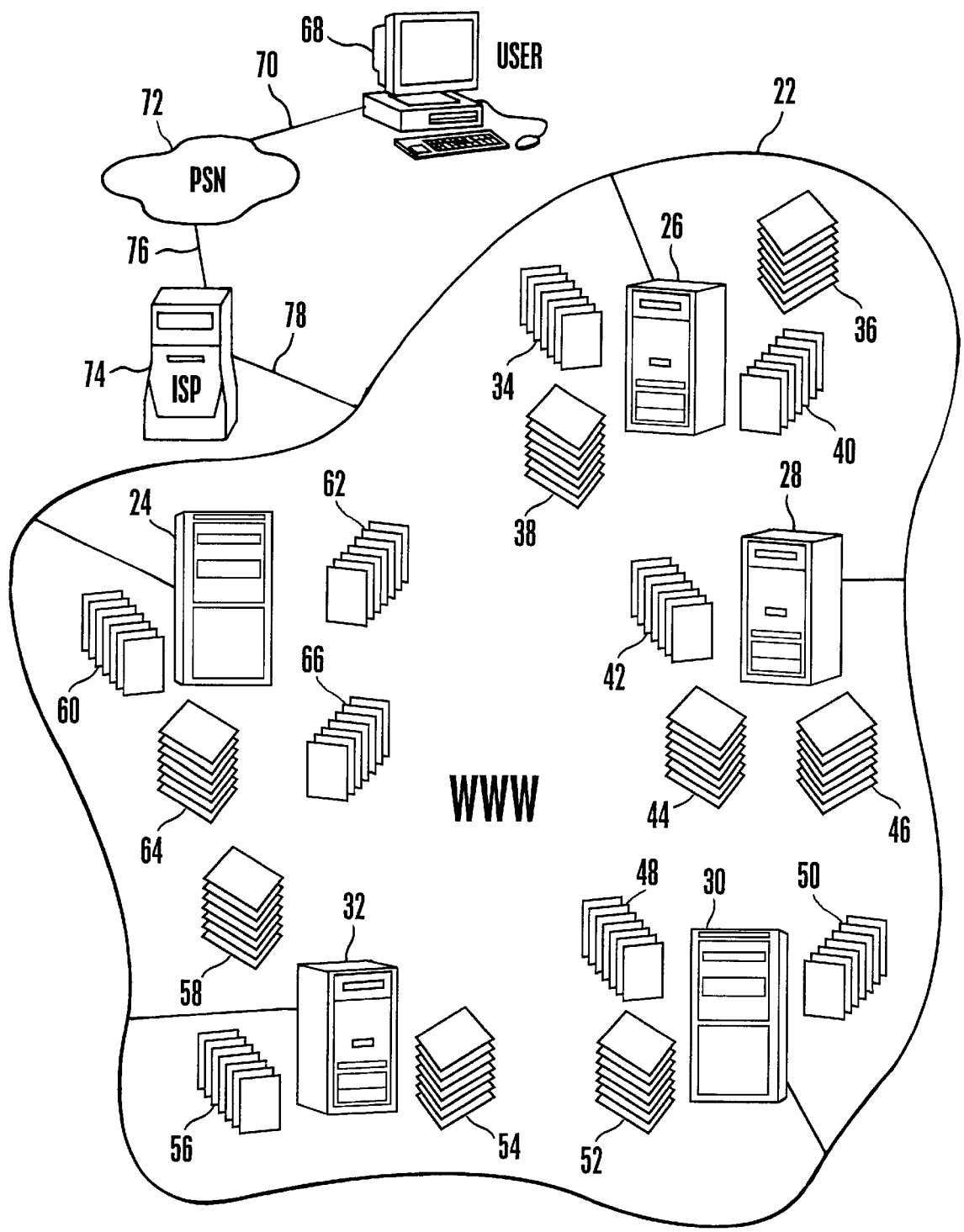
FIG. 1 is a diagram illustrating an Internet environment including a number of World Wide Web sites and associated servers having page information suitable for being maintained in a frame-based, hierarchical database created or maintained in accordance with the method of the present invention.

As noted, the World Wide Web of the Internet, referred to here for simplicity as the "Web", represents a valuable and important information resource, including literally hundreds of millions of documents accessed by tens of millions of users daily. With reference to FIG. 1, as is well known, the Web 22 includes millions of Web sites, several of which, again for simplicity, are schematically represented as Web site servers 24 to 32, it being understood that a single server might host one or more sites. Additionally, and as shown, each Web site 24 to 32 includes numerous information pages arranged in Web applications, e.g., Web sites, Web site databases, etc., 34 to 66. Further, and as is also well known, a user, at his personal computer 68 equipped with a suitable Web browser and communications software, can access Web 22 over his ordinary phone line 70, the public switching network 72 and through an Internet service provider 74, which itself may be connected to public switching network 72 by an ordinary line 76 and to Web 22 by a high-speed data line 78. And, with this setup and some computer protocol magic, the user can access the literally hundreds of millions of documents available on Web 22 represented by applications 34 to 66 in FIG. 1.

As is pointed out, however, this great mass of information represents difficulties for the user in the form of retrieval and organization problems. And, as also pointed out, method 2 of the present invention provides the user with a means for dealing with those problems.

Particularly, and as noted in connection with the above description of the broad aspects of the invention, method 2 provides solutions to those problems in the form of steps for enabling the user to interactively create an information database having an organizational structure which the user can interactively personalize to his tastes for holding the information he retrieves, and steps for enabling automated retrieval of reduced size, i.e., distilled, preferred-authority collections of Web pages responsive to his queries.

Figure 10:
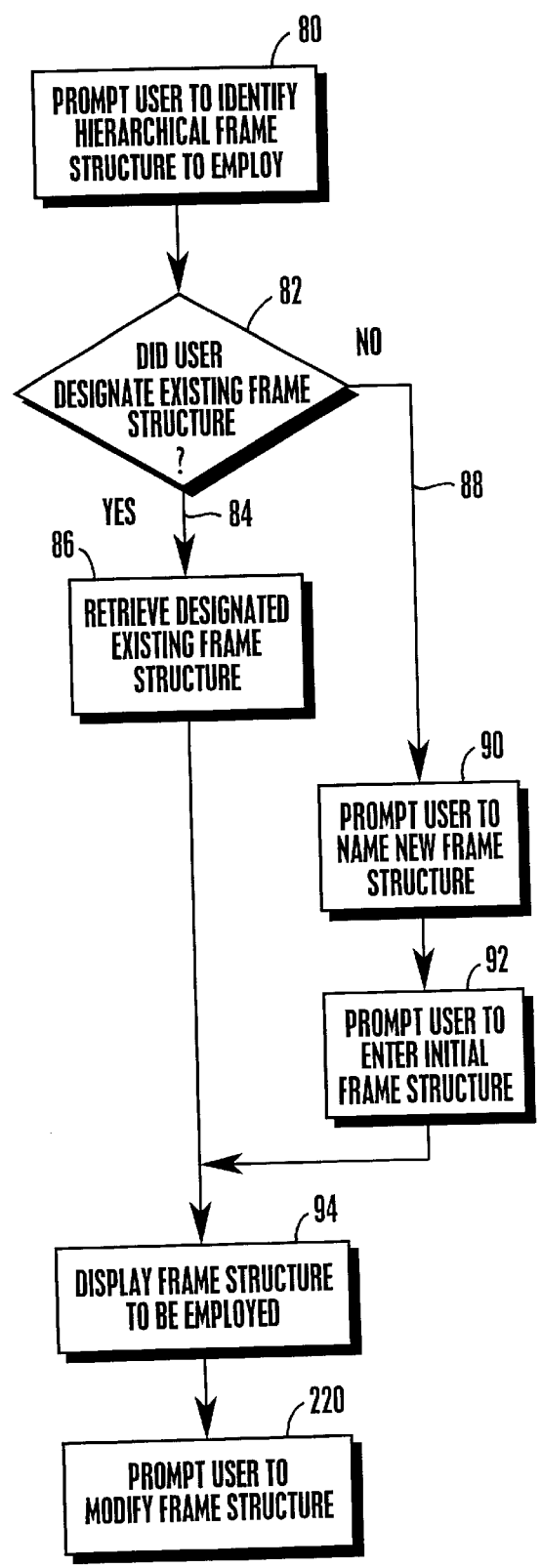
FIG. 10 is a flow diagram illustrating the more specific steps associated with the "Develop Classification Frame Hierarchy" general step of the method in accordance with the present invention illustrated in FIG. 9.

As described in connection with FIG. 9, method 2 broadly includes step 4 for enabling the user to develop a frame-based, hierarchical information classification structure for his personalized database. As shown in FIG. 10, step 4 of method 2 includes a series of more detailed steps for carrying out that procedure. Specifically, classification development step 4 is seen to include step 80 which would follow activation of the software in which method 2 is implemented and embodied, at user's personal computer 68, step 80 prompting the user to identify, i.e., provide the file name and path, for the hierarchical database frame structure method 2 should initially access.

As will be appreciated, in the case where the user has previously developed a database structure, he could call it at this point, and continue with its use and evolution. In the alternative, where the user wishes to develop a new structure, but, one having some similarity to the preexisting structure, he could designate the preexisting structure and employ it as a basis for the new structure and database. In this case, however, the user would be required to rename the initially-used, preexisting structure if he intended to retain it, otherwise, in conventional fashion, the preexisting structure, as modified would be saved under the original structure filename, thus corrupting the original structure.

In the case where no preexisting structure is available, the user could simply start from scratch, i.e., from nothing, indicate a new name for the structure to be created, and proceed.

Accordingly, and with reference to FIG. 10, following prompt step 80, method 2 is seen to include step 82 which, responsive to the user's designation, advances either over program-flow branch 84 to retrieve, at step 86, any preexisting structure which the user has identified, or over program-flow branch 88 in the case where the user has indicated he is going to develop a new structure. Where the user has indicated he is going to develop a new frame structure, method 2 advances over branch 88 to step 90 which prompts the user to provide the name for the new classification structure. Following step 90, and the user's submission of an identification for the new structure, method 2 advances to step 92 where the user is prompted to provide an initial structure element, e.g., a classification frame, for the new structure. Subsequently, method 2 program-flow advances from either step 86, for retrieval of a designated preexisting frame structure, or from step 92 for initiation of a new frame structure, to converge at step 94, where method 2 displays the frame structure to begin processing with.

With regard to the information structure, experience has shown hierarchically organized data and, particularly frame-based, hierarchical organized data featuring representations of information categories as a hierarchy of frames having frame attributes and attribute values, that characterize and distinguish the respective frames and their associations to each other provides a representation that enable users to more readily understand and appreciate the information elements and their relationships. Still further, it has also been found that the hierarchical organization of information enables a much speedier search when information is sought to be retrieved. Particularly, when a particular element of information is sought, identification of its category affiliation not only designates the features to be looked for, but also immediately excludes features, and other aspects of the organizational structure not to be looked for, thus more immediately directing the search to the relevant section of the organization.

Figure 2:
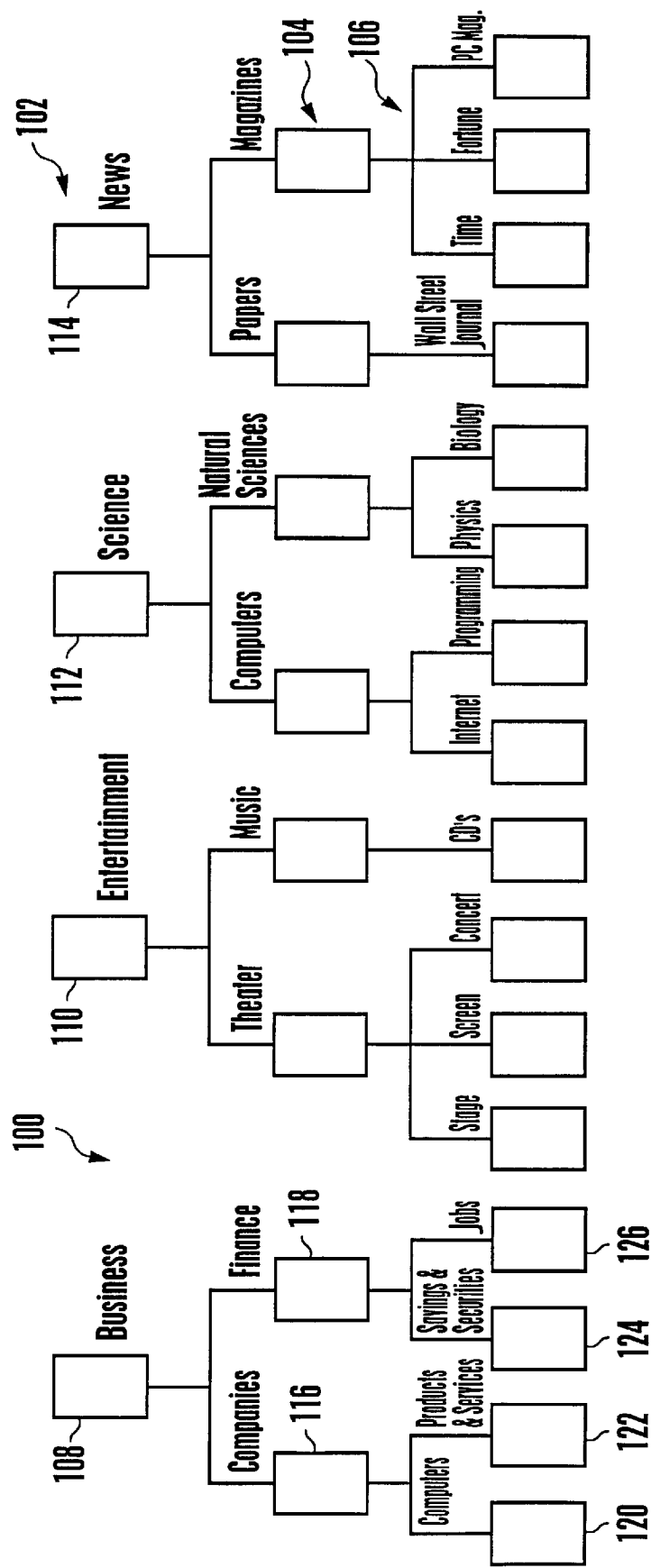
FIG. 2 is a diagram illustrating a hierarchical organization of information suitable for being maintained in a frame-based, hierarchical database created or maintained in accordance with the method of the present invention.

Accordingly, method 2 in preferred form, supports frame-based, hierarchical organizational structures for the information the user seeks to catalog. FIG. 2 illustrates such an organizational structure.

As shown in FIG. 2, a frame-based, hierarchical organization structure 100 which was previously created, is seen to include a plurality of frames arrayed in hierarchical relation for representing a general classification of information. As is well understood in the art, the respective frames feature attributes and attribute values for identifying the nature of each frame and its relationships to the other frames. Particularly, in accordance with association rules commonly applied to hierarchical organizations, attributes appearing at a particular frame level in the hierarchy, apply to all depending frames of lower hierarchical level. Further, within a level, frames may be given different attributes and/or different attribute values to, thereby, identify different subcategory types within the category level.

Figure 3:
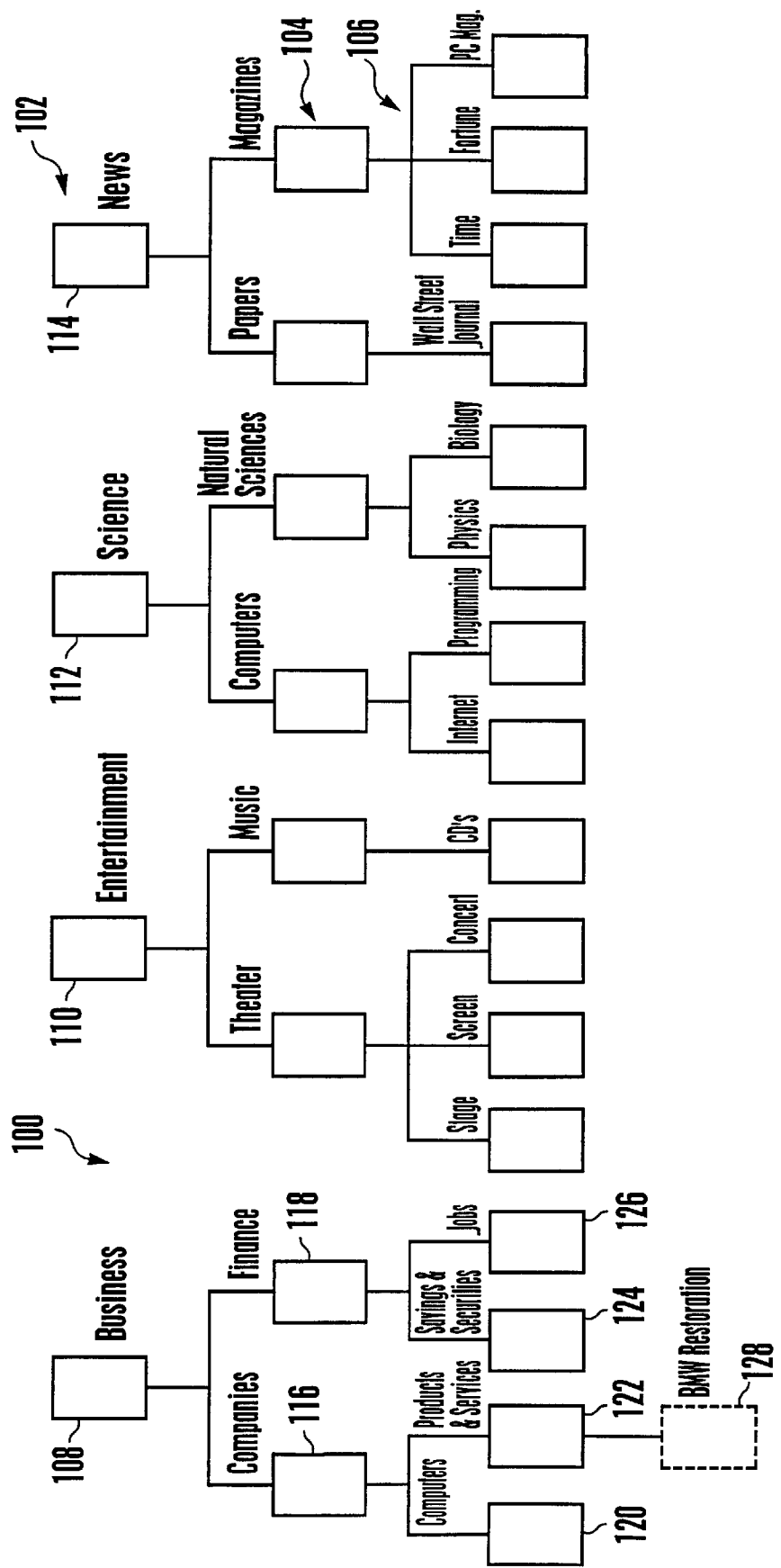
FIG. 3 is a diagram illustrating a hierarchical organization of information suitable for being maintained in a frame-based, hierarchical database in which a new information category frame has been suggested for addition in accordance with the method of the present invention.
Figure 4:
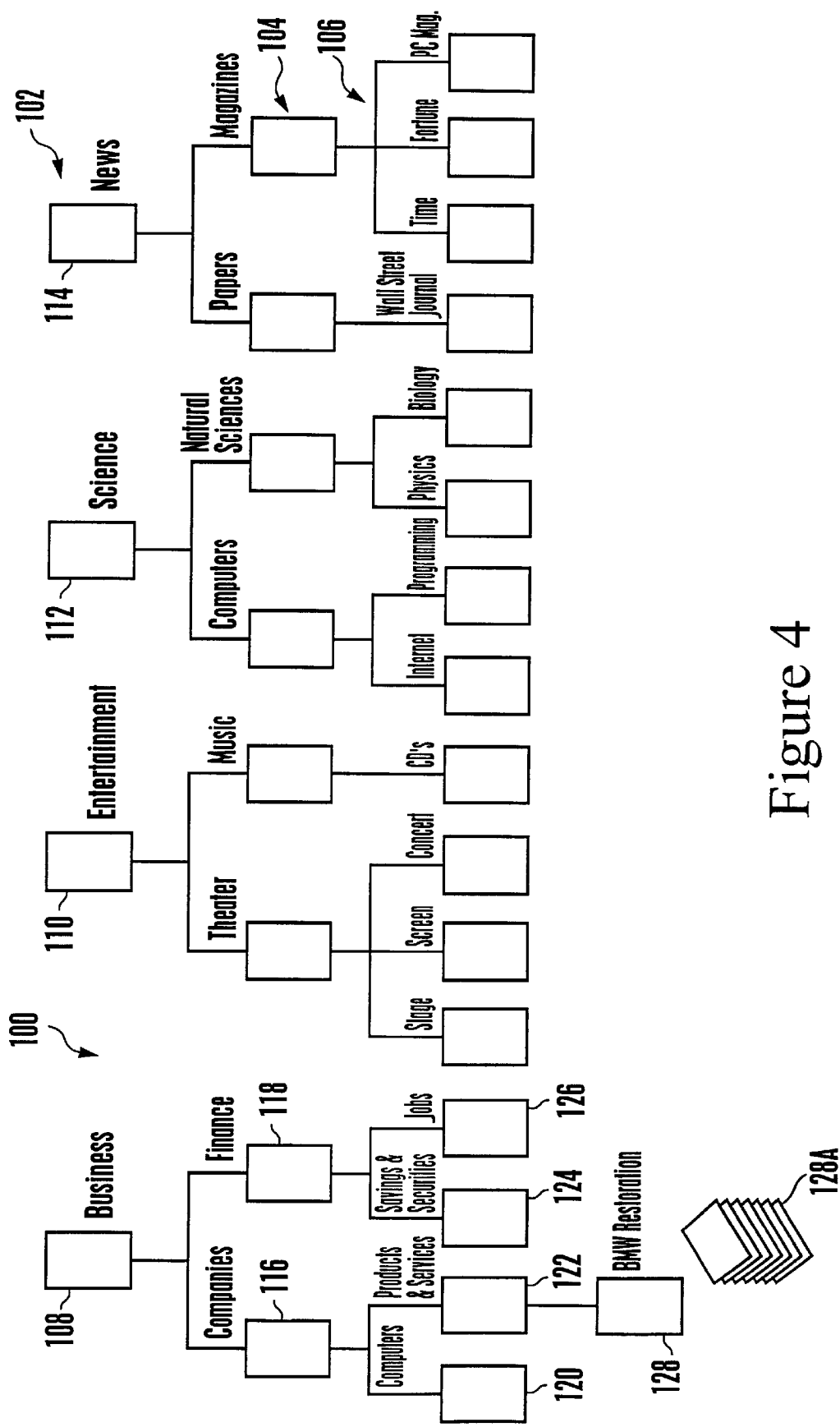
FIG. 4 is a diagram illustrating a hierarchical organization of information suitable for being maintained in a frame-based, hierarchical database in which a new information frame has been added and populated with Web pages in accordance with the method of the present invention.

The nature of frame relationships may be readily understood with reference to structure 100. As seen in FIG. 2, structure 100 features three levels of organization, 102, 104, 106 the highest and most general 102, including four frames, specifically frames 108 concerning "Business", 110 concerning "Entertainment", 112 concerning "Science", and 114 concerning "News". Beneath frames 108 to 114 is a second categorization level 104 which further defines first level 102. Particularly, and for ease of explanation, with reference to frame 108 "Business", only, structure 100 is seen to feature frames 116 "Companies" and 118 "Finance", both of which depend from frame 108. And, beneath frames 116, 118, structure 100 is further seen to include a third category level 106 which yet additionally defines second level 104 and first level 102. Particularly, third level 106 for frame 108 of level 102 is seen to include frames 120, "Computers", 122 "Products & Services", 124 "Saving & Securities" and 126 "Job", frames 120 and 122 depending from frame 116 "Companies" and frames 124 and 126 from frame 118 "Finance." FIG. 3 shows yet a fourth level, represented by "BMW restoration" box 128 under box 122, while FIG. 4 shows that "BMW restoration" box 128 can have plural associated pages 128A.

Accordingly, based on the frame structure and associated frame attributes and attribute values just described, it would follow that frame 122 "Products & Services", as a "child" of frame 116 "Companies" and "grandchild" of frame 108 "Business", in view of the above discussion concerning attribute inheritance, carry the attribute limitations of its progenitors. Specifically, frame 102 would be considered to include product and service information of business companies only.

In the case where a user intending to employ structure 100 for organizing his information found such limitations inappropriate or undesirable, in accordance with the present invention, he could readily undertake interactive modification of structure 100.

While at first blush, this may seem straightforward, those skilled in the database art will appreciate that in the past, it was not readily possible to modify database structure, as to do so would typically require reloading of the database data. As is apparent from the above discussion of hierarchical frame attribute inheritance rules, if a frame in a hierarchy is changed, the limitations associated with related frames of the hierarchical structure, e.g., parent, child, related frames, must also change, thus potentially causing data previously held at a frame prior to a frame structure change, to no longer be appropriate for the same frame after a modification of the structure.

The invention provides steps to easily and quickly obtain information for repopulating or modifying frames, and additionally and independently provides steps for supporting a display interface that enables the user to readily add, delete, or move frames within a hierarchical information organizational structure.

Figure 5:
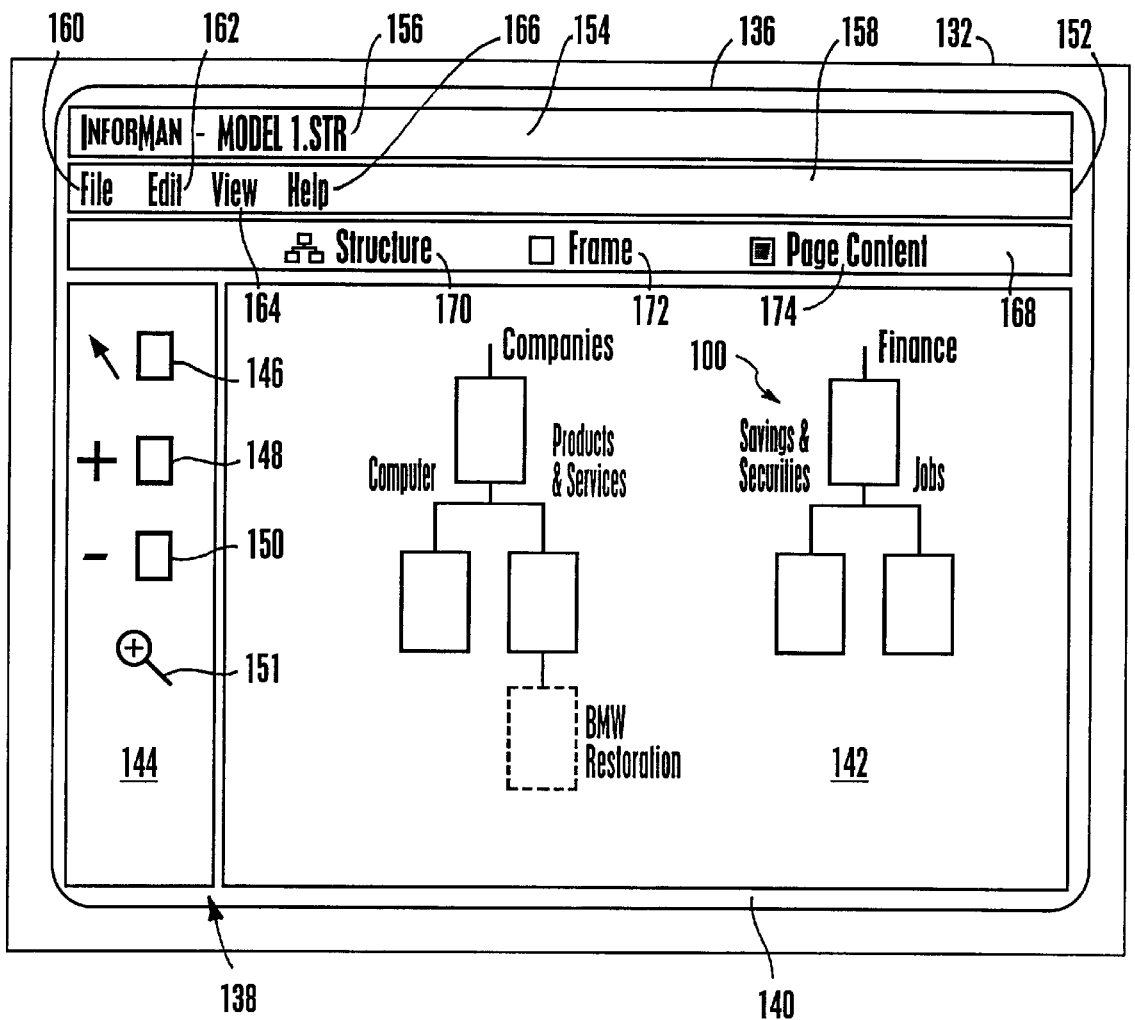
FIG. 5 is a schematic illustration of the display interface presented to a user for enabling creation or modification of a database hierarchical organizational structure in accordance with the method of the present invention.

To facilitate this, method 2 of the present invention features steps for presenting a display at the monitor of user's computer 24 for enabling the user to interactively and easily modify structure 100. With reference to FIG. 5, user's monitor 132 is seen to have a display 136 at which interface 135 or 138 in accordance with method 2 is illustrated. In accordance with the invention, method 2 includes program steps for providing interface 138 with one or more screens having multiple partitions. As shown in FIG. 5, interface 138 in preferred form includes a first screen 140 having a partition 142 for displaying the hierarchical, information organizational structure 100. Additionally, interface screen 140 includes a second partition 144, including graphically presented tools for modifying structure 100. Specifically, tool partition 144 for screen 140 includes a tool 146 for selecting frames of structure 100. Additionally, tool partition 144 includes tools 148 and 150 for respectively adding and deleting frames from structure 100. In accordance with the invention, a user can freely move frames within structure 100 using selection tool 146 in conventional "drag-and-drop" fashion. Still further, tool partition 144 is seen to include a "zoom" tool 151 for enabling the user to zoom in and zoom out organizational structure 100 to see, respectively, fewer or more frames.

Yet additionally, interface screen 140 is also seen to have a partition 152 including a section 154 for identifying the filename 156 associated with organizational structure 100. Further, partition 152 is also seen to include a section 158 including "drop-down" menus in conventional "Windows" fashion for enabling management of interface 138, including "File" 160, "Edit" 162, "View" 164 and "Help" 166. Still further, screen partition 152 is also seen to include a section 168 including interface mode buttons for enabling movement between interface mode screen. More specifically, section 168 of partition 152 is seen to include a mode button 170 "Structure" for viewing organizational structure 100 at screen partition 142, and a mode button 174 for viewing the information elements, e.g., Web page content of any frame selected with selection tool 146 as will be more fully described below. Finally, section 168 of screen partition 152 is also seen to include a mode button 174 for viewing the contact of the respective information elements, e.g. Web pages populating a particular frame of structure of 100 as also will be described more fully below.

Figure 6:
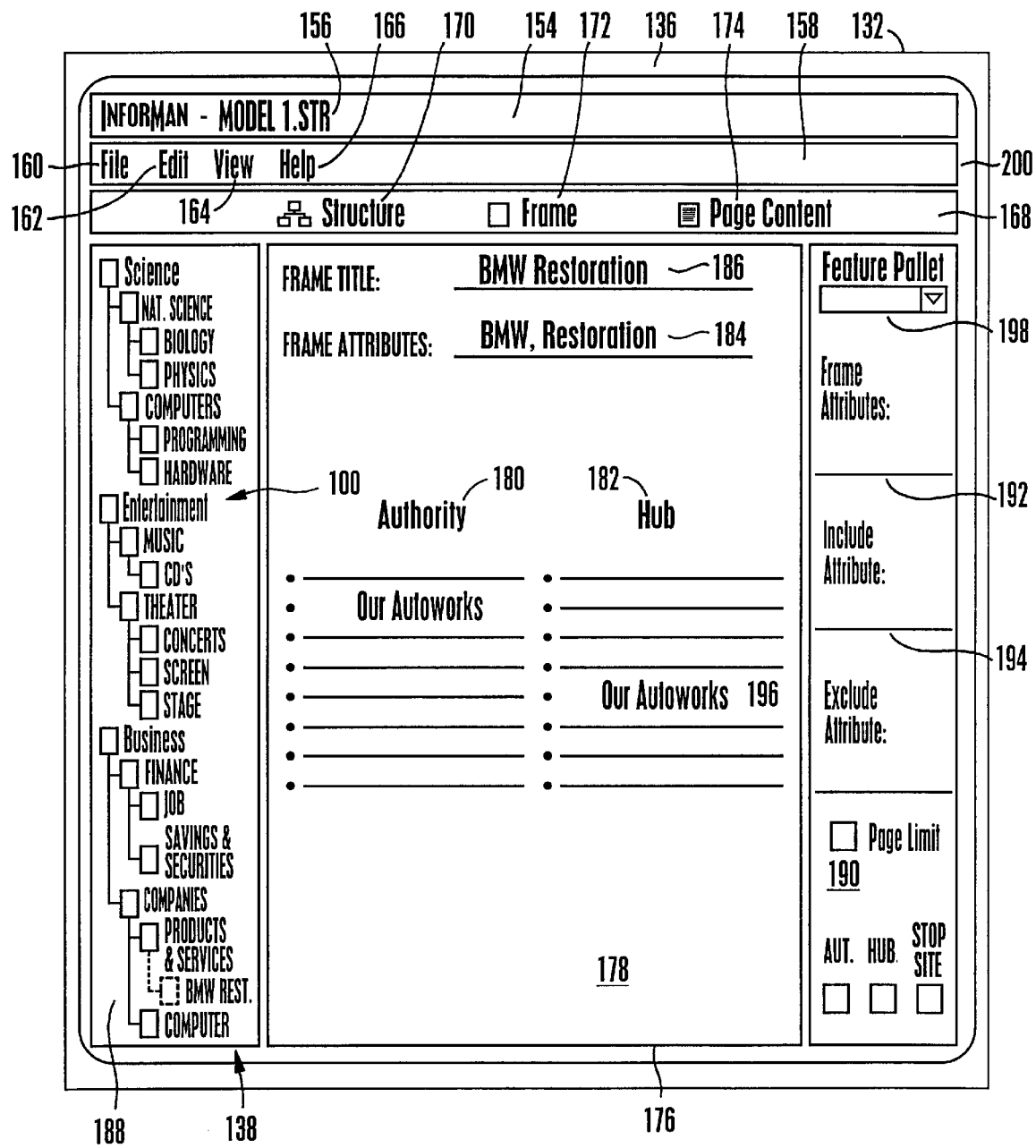
FIG. 6 is a schematic illustration of the display interface presented to a user for disclosing the page population of an information frame of a database hierarchical organizational structure in accordance with the method of the present invention.
Figure 8:
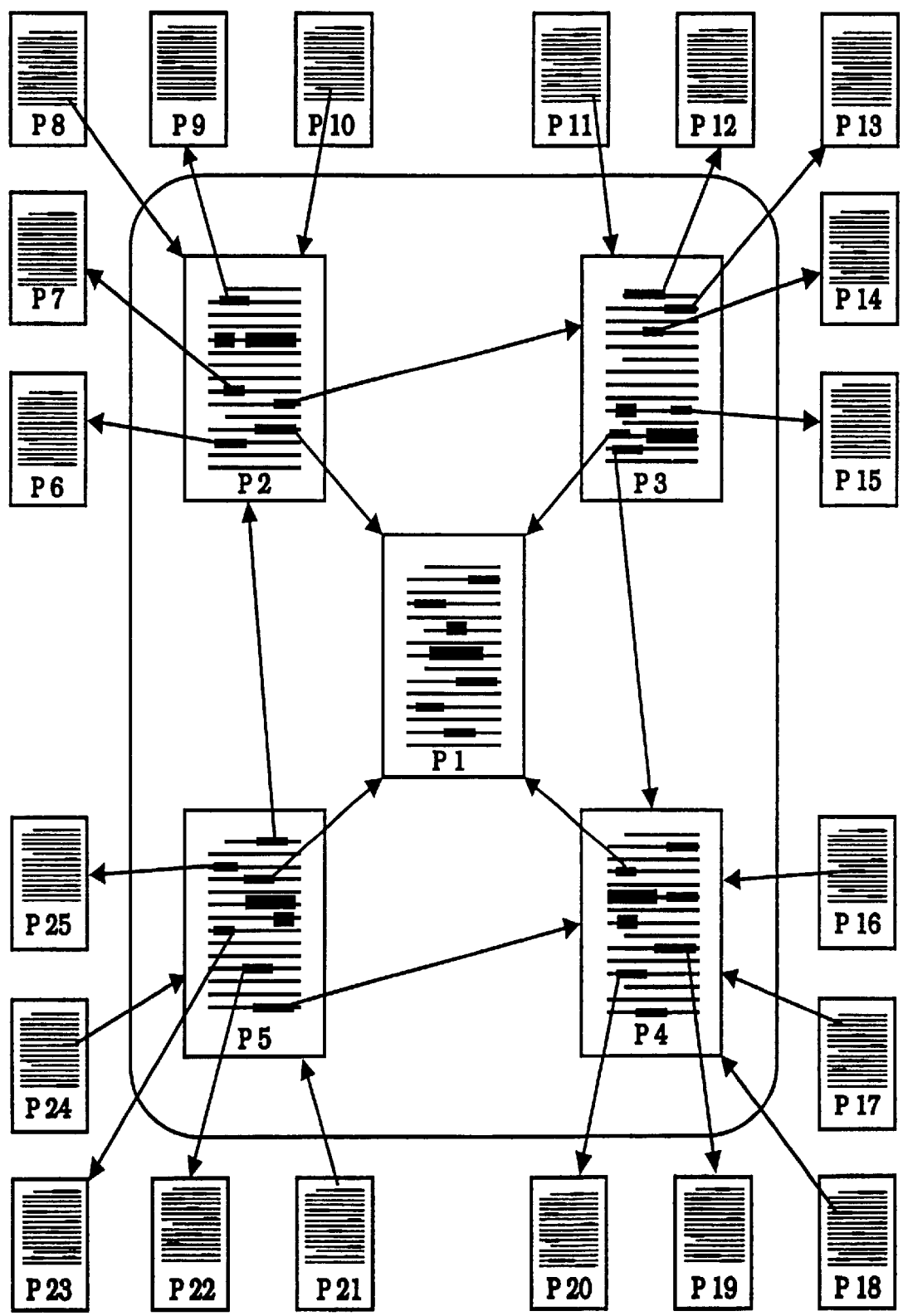
FIG. 8 is a diagram illustrating a root set of pages expanded from an initial set of pages returned in response to a query based upon the attributes of a frame proposed to be added to a database hierarchical organizational structure in accordance with the method of the present invention.

Continuing with reference to FIG. 6, screen interface 138 in preferred form includes a second screen 176 having multiple partitions. Specifically, screen 176 includes a partition 178 for displaying the information elements, e.g. Web pages, which populate a particular frame of organizational structure 100. In accordance with the invention, method 2 includes steps for presenting the pages of a frame identified as authorities in column 180, and pages identified as hubs at column 182. Further, partition 178 also includes presentation of the attributes for the frame of structure 100 being presented at partition 178 at region 184, and the title for the respective frame at region 186. FIG. 8 schematically shows a diagram illustrating a root set of pages expanded from an initial set of pages returned in response to a query based upon the attributes of a frame proposed to be added to a database hierarchical organizational structure in accordance with the method of the present invention.

As is also seen in FIG. 6, interface screen 176 includes a partition 188 for displaying frame structure 100. In accordance with method 2, structure 100 at partition 188 may be readily scrolled in typical Windows Explorer fashion. Still further, control of the frame content at partition 178 may be readily effected by selecting frames of structure 100 in conventional fashion, as for example, with a mouse pointer. Also in preferred form, frames of structure 100 may again be freely managed, for example, added, deleted and moved at partition 188.

Screen 176 in accord with method 2 is also seen to include a partition 190 for enabling: editing of the frame page content. More specifically, partition 190 is seen to include information entry boxes 192, 194 for respectively entering modifications to the frame attributes which control the initial query for returning information elements, e.g., pages for populating the selected frame in accordance with method 2 as will be described more fully below. Particularly, entry box 192 enables user specification of a frame attributes to be included in the initial query, while entry box 194 enables the user to expressly exclude attributes not desired because of known lack of relevance to the subject frame. Additionally, partition 190 is seen to include a scroll box 198 including at predetermined list of frame features known to produce pages of authority for listed features. In accordance with method 2, where the user is uncertain what attributes to include for frame, he can make reference to feature pallet 198.

Finally, screen 176 is also seen to include a partition 200 identical to partition 152 of screen 140 including, respectively, designation of the display structure filename, menus, and mode buttons.

Figure 7:
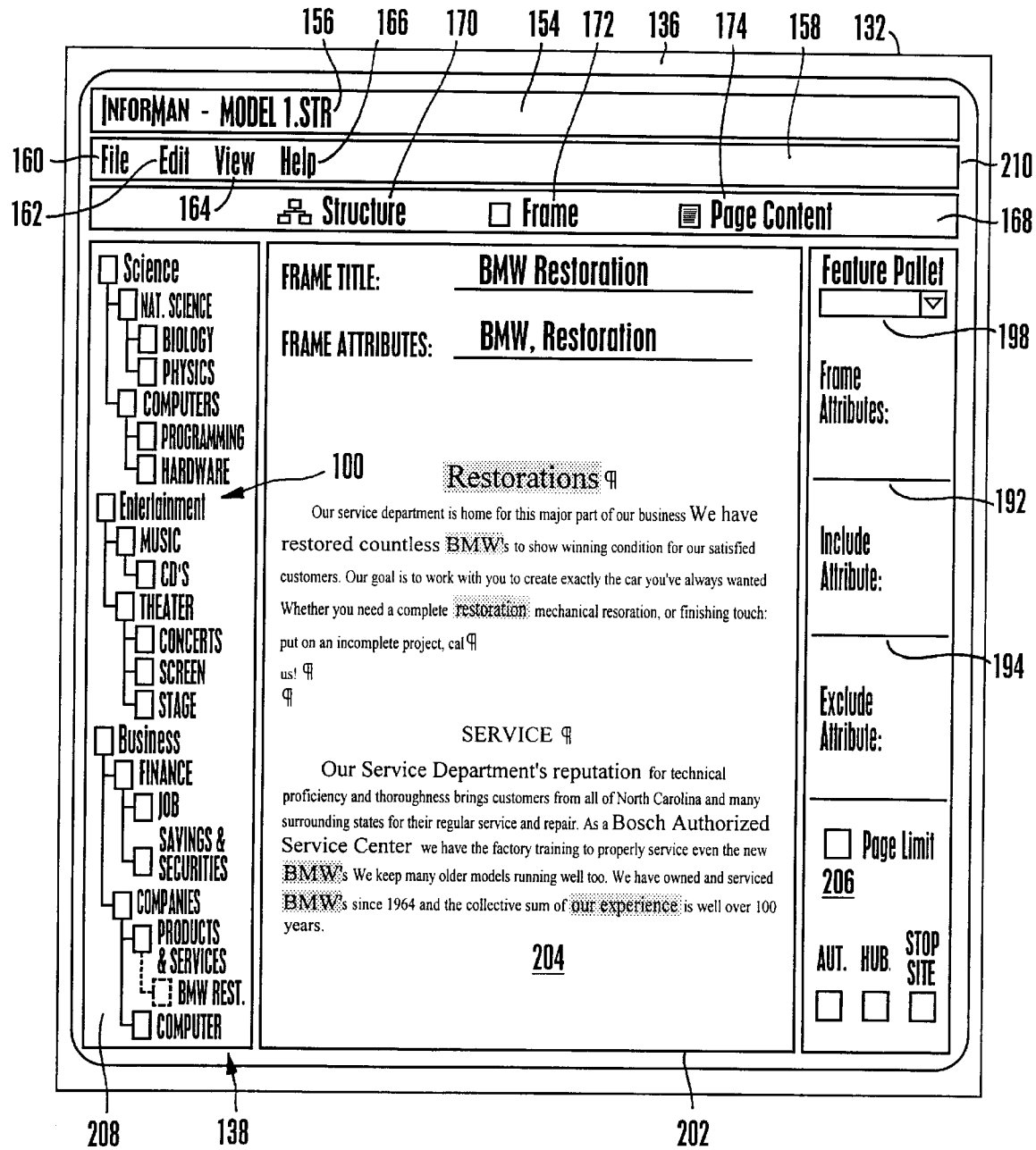
FIG. 7 is a schematic illustration of the display interface presented to a user for disclosing the content of a page included as a member of the page population for the information frame of a database hierarchical organizational structure in accordance with the method of the present invention.

Continuing with reference to FIG. 7, interface 138 in preferred form is seen to include a third screen 202 again having multiple partitions. In the case of interface screen 202, a partition 204 is provided for displaying the content of a document included in the lists of authority and hub pages for a selected frame presented at partition 178 of interface screen 176. Presentation of the content and links for an authority or hub page selected from respective lists 180 and 182 enables the user to quickly and easily monitor the effectiveness of the query and search process, and iteratively adjust the pages returned to populate the selected frame of structure 100.

To further assist in that process, in the preferred form screen 202 also includes an editing partition 206 comparable to partition 190 of screen 176, and a structure display partition 208 comparable to partition 188 of screen 176. Still further, screen 202 is again seen to include a partition 210 comparable to partitions 200 of screen 176 and partition 152 of screen 140 which present the filename for structure 100, drop-down menus and mode buttons.

Figure 11:
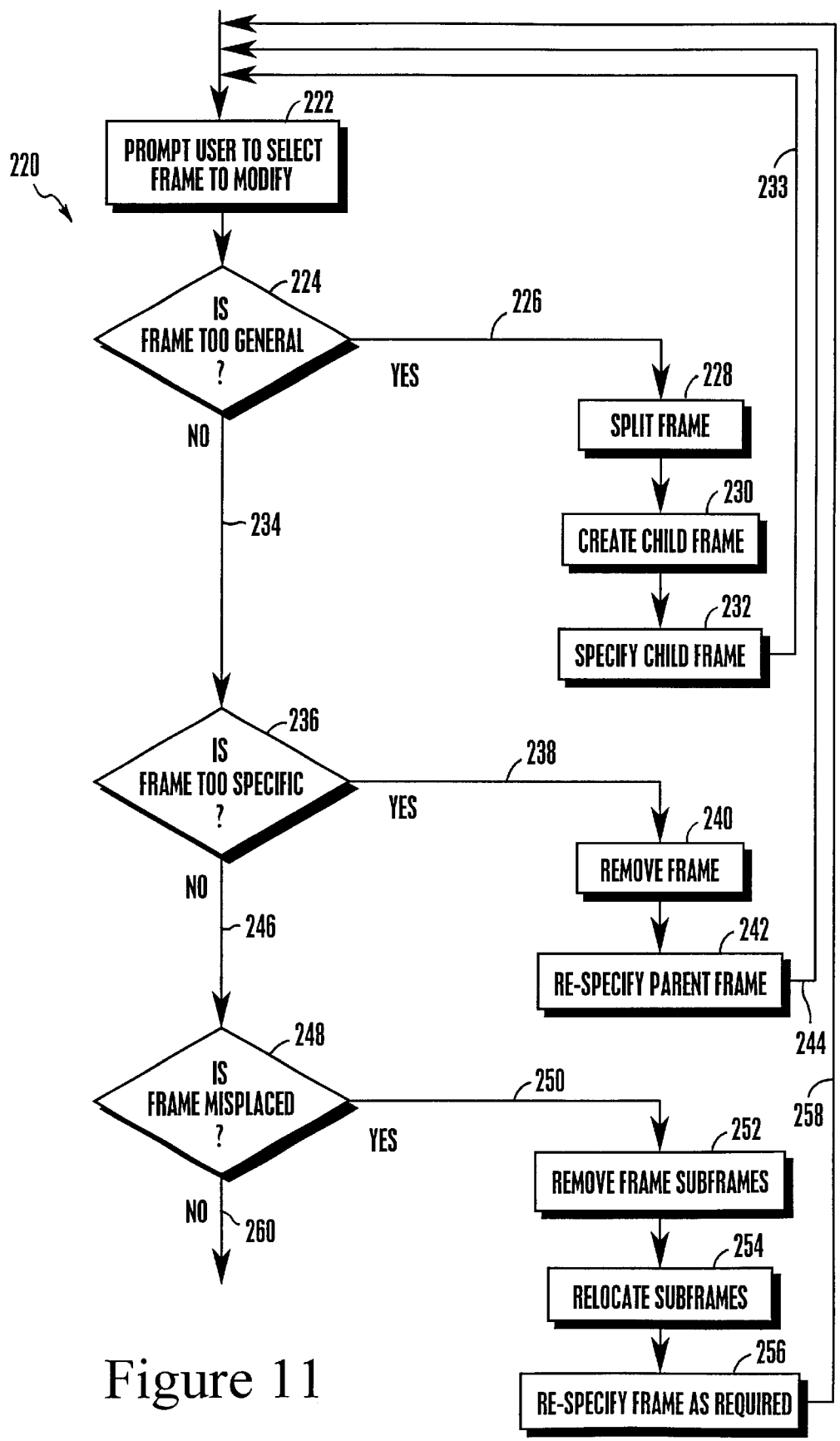
FIG. 11 is a flow diagram illustrating the more specific steps associated with the "Prompt User To Modify Frame Structure" step of FIG. 10, FIG. 10 itself illustrating the "Develop Classification Frame Hierarchy" general step in accordance with the invention illustrated in FIG. 9.

Continuing with reference to FIG. 11 following display of the information structure, e.g., structure 100, method 2 includes step 222 for enabling the user to modify structure 100. As better seen in FIG. 11, method 2 includes step 222 for prompting the user to select a frame to modify. As can be appreciated, step 222 would be interactively conducted with the user at method interface 138. Specifically, method 2 includes program steps for successively presenting to the user interface screens at which the user can make judgments as to whether changes in structure 100 are required.

For example, once the user has selected a frame of structure 100 to modify at step 222, in accordance with the method, interface 138 provides displays, e.g., screens 140, 176 and 202 for enabling the user to make judgments as to whether frame modification would be desirable.

Particularly, at step 224 following step 222 in FIG. 11, the user can make a judgment as to whether frame structure 100 is too general or not based upon a review of the authorities and hubs presented at interface screen 176 and their content at screen 202, for example, as the frame existed prior to being worked or during the course of subsequent population steps. As seen in FIG. 11 if the user finds a selected frame to be too general, method 2 would proceed over branch 226 to step 228 where the user could split the selected frame and add at step 230 child frames having more specific frame attributes to specify at step 232. Addition of a frame could be readily effected and interface 138 as described above.

Thereafter, method 2 would loop back over method branch 233 to modification prompt step 222 where the user could again assess whether further modifications were necessary. For example, if after specifying addition of a frame at step 230, the user determines the frame specified at step 232 is too specific, the user would advance method 2 over branch 234 to step 236, where the user could then advance method 2 over branch 238 to step 240 where the user could readily delete a frame at interface 138 as above described and respecify a parent frame at step 242. And, again, method 2 would loop back to step 222 at method 2 branch 244.

Following return to step 222, the user could again determine if any further modifications of structure 100 were called for. For example, if the user neither found the selected frame too general nor too specific, method 2 would advance over branch 246 to step 248 where the user could determine if the selected frame is misplaced and is required to be moved. If the user determines that the selected frame should be moved, method 2 would advance over branch 250 to steps 252, 254 and 256 where the associated subframes could be removed and replaced in structure 100 as required at steps 252 and 254, respectively, and the selected frame re-specified at step 256 for its new location. Thereafter, method 2 would loop back over branch 258 to step 222 to enable the user to again assess whether any further modifications to structure 100 were called for. If the user found that no further modifications to the structure were called for, method 2 would exit the structure modification sequence at branch 260.

With reference to FIG. 9, following completion of structure development step 4, as noted, method 2 would advance to step 6 where the user could select the frame he would like to populate with information pages. Following designation by the user of the frame he would like to populate, the method advances to step 8 where population of the selected frame is undertaken.

Before describing program flow for frame population with information element, e.g., Web pages, a review of the information elements search process would be appropriate.

While methods previously known for computing authoritativeness exploit the annotative power latent in hyperlinks, method 2 of the present invention seeks to determine what a first information element, e.g., page i says about a second information element, e.g., page j. To investigate this, method 2 defines a numeral affinity from i to j denoted $a_{ij}$. At a high level, method 2 consists of three steps:

1. Acquisition of a root set of entities to be analyzed. In many applications of method 2 this process consists of obtaining an initial set via a Boolean keyword search and then expanding it, to include neighbors one link distance away;
2. Approximate calculation of one or more of the eigenvectors of one or both of two possible similarity matrices as noted below;
3. Analysis of the computed eigenvectors(s) to rank and/or partition this set of entities.

If n=|S| and $a_{ij}$ be a non-negative real-valued affinity of the ordered pair of entities of entities (i, j), so $a_{ij}$ need not equal $a_{ji}$. Typically, each $a_{ij}$ is a carefully chosen function of the terms and where applicable links in the entities, this choice is data source and application dependent. Let A=$[a_{ij}]$. In accordance with method 2, the iteration $$h \leftarrow Aa, A \leftarrow A^T h$$

is performed to arrive at hub and authority scores converging to the principal eigenvectors, those associated with the largest eigenvalue of $A^T A$ and $AA^T$, respectively. Then the entities with the largest entities in the principal eigenvector of $A^T A$ (resp. $AA^T$) as the top authorities (resp. hub) are outputted.

In accordance with method 2, the procedure begins by constructing a root set of pages that are likely to be relevant to the topic. This construction is arbitrary, but could be performed by creating an initial set of pages by querying a traditional search engine using the topics as query, and then expanding this set to the full root set by including all pages that point to or are pointed to by a page in the initial set. The procedure the associates −33—with each page p a hub weight in (p) and an authority weight a(p), all initialized to 1. Then the weights are updated as follows:

$$a(p):=\Sigma h(q), h(p):=\Sigma a(q)$$

In accordance with method 2, the basic procedure is modified in several ways in order to remove spurious effects that adversely affect the noted computation.

Particularly to avoid self-promotion of Web sites that confer their authority upon themselves, we discard links to pages on the same site. We define two pages to be on the same Web site using the following test: class A and B IP addresses must match to most two significant octets; class C addresses must match three most significant octets, and class D addresses must match all four octets.

Regarding redundant hubs, the value of a hub page is by definition in its links rather than its contents. If all the destinations accessible from a particular hub are also accessible from better hubs, we do not need to output this hub. More generally, we seek to return a set of hub pages that together contain as many unique, high-quality links as possible. We therefore apply a well-known greedy test as follows: once the iteration step has converged to return the best hub, zero the authority values of all pages pointed to by the hub, recompute hub values, and iterate.

With respect to related page factors, it has been found that by the self-promotion removal procedures it is possible for instance for an organization home page, and several children of that page to accumulate authority. However, in the final output the method seeks to provide the user as much authoritative substance as possible in a small number of pages. To achieve this, after each step of iteration the method re-packs the authority of any site as follows: if multiple documents within a logical site as defined above have non-zero authority, the authority of all but the page with the largest authority are set to zero.

Finally, with regard to false authority, it has been found that many resource compilations such as bookmark files contain pages pertaining to a number of disjoint topics. This causes such compilations to become good hubs, which in turn cause irrelevant links from the same page to become good authorities. To address this problem, method 2 notes that pointers to pages on the same topic tend to be clustered together in resource compilations. Method 2 therefore allows each link in a Web page to have its own hub value so the hub value of the page becomes a function of the particular link rather than a constant. When computing authority values, the authority of the destination is incremented by the hub value of the link. When computing hub values, the authority value of the destination is used to increment the hub value of the source link and according to a spreading function, the hub values of neighboring links. Thus useful regions of a large hub page can be identified. The final hub value of a page is the integral of all the hub values of its links.

Convergence of the filtering computation depends on phrasing the iterate in steps as a matrix multiplication. Method 2 described above still fits the framework. Particularly, the self-promotion and rebounded hub procedures are arranged as pre- and post-processing steps and the false authority procedure is arranged as a linear transformation that may be expressed as a matrix multiplication.

FIGS. 12–18 show further details of the overall method illustrated in FIG. 9, as summarized in the Brief Description of the Drawings. Commencing at block 1000 in FIG. 19, the frame information element (e.g., Web page) population is viewed. Moving to decision diamond 1002, it is determined whether the population is acceptable, and if so, the logic continues to FIG. 13. If the population is not acceptable, the logic flows to block 1004, wherein the frames attributes can be modified if desired, and then to block 1006, wherein a key word search is executed to identify an initial set of information elements. The initial set is expanded at block 1008 to a root set, and then the elements of the root set are ranked at block 1010. These ranked elements are next truncated at block 1012, with the frame being populated at block 1014 with the truncated, ranked set.

Figure 12:
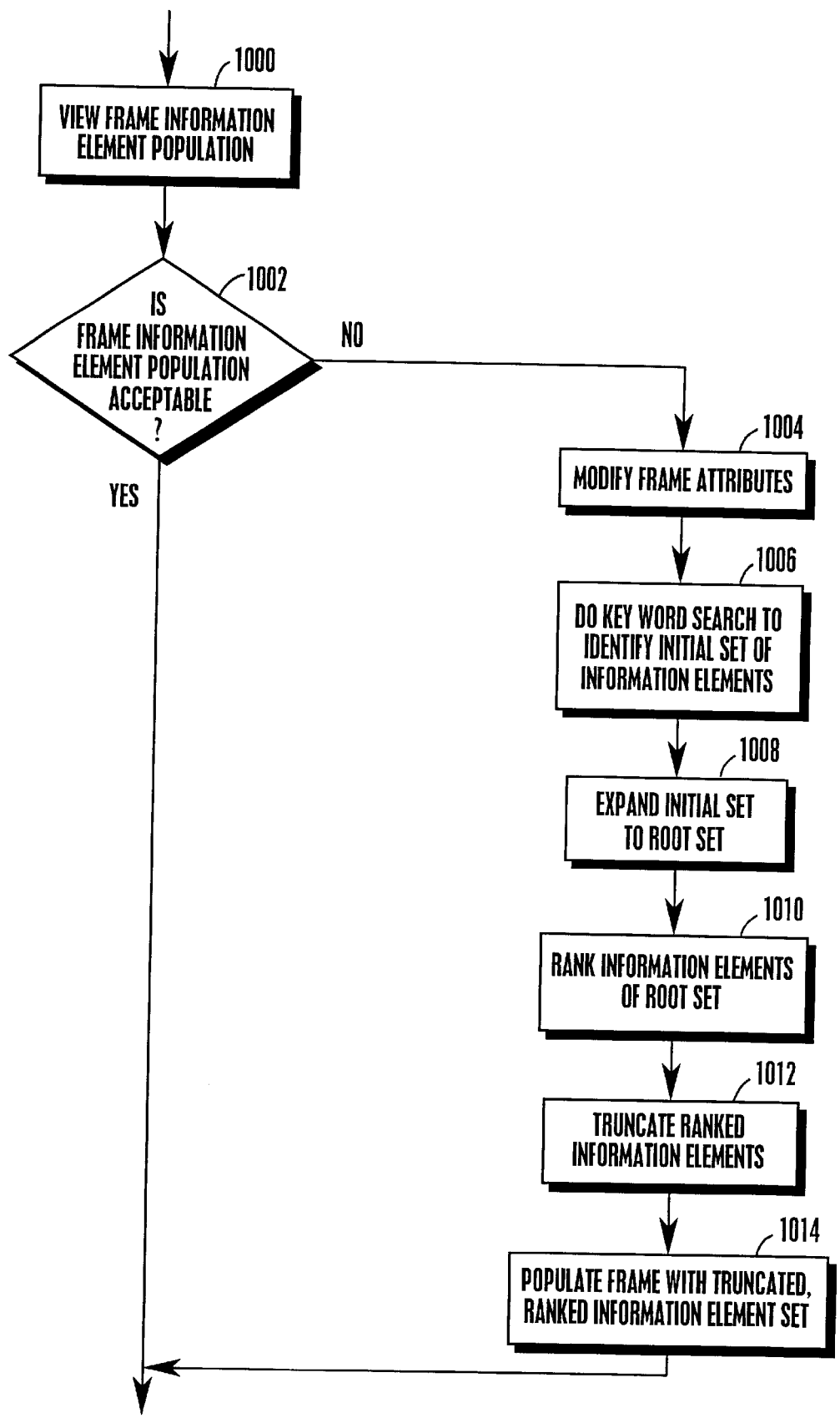
FIG. 12 is a flow diagram illustrating the more specific steps associated with the "Populate Selected Frame With Information Elements" general step of the method in accordance with the present invention illustrated in FIG. 9.
Figure 13:
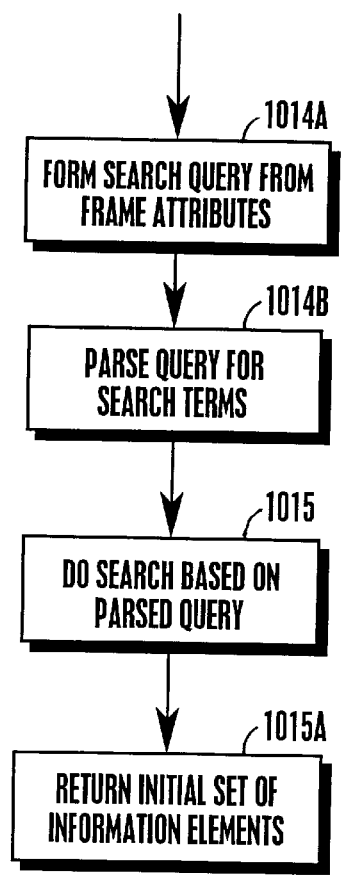
FIG. 13 is a flow diagram illustrating the more specific steps associated with the "Do Key Word Search To Identifying Initial Set Of Information Elements" step of FIG. 12, FIG. 12 itself illustrating the "Populate Selected Frame With Information Elements" general step of the method in accordance with the present invention illustrated in FIG. 9.
Figure 14:
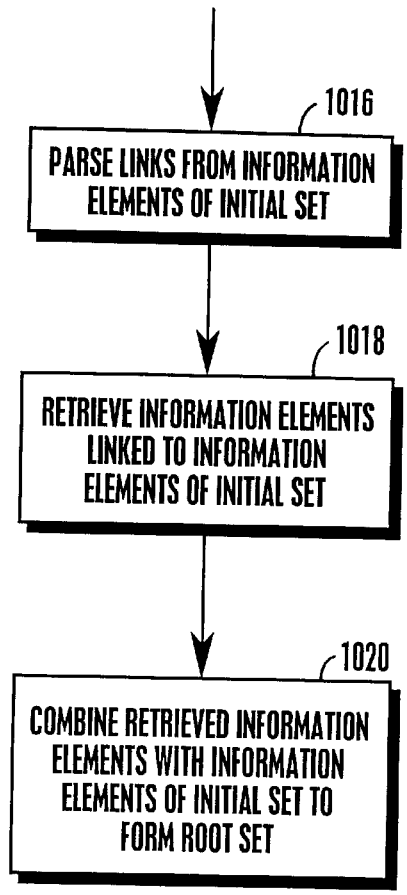
FIG. 14 is a flow diagram illustrating the more specific steps associated with the "Expand Initial Set To Root Set" step of FIG. 12, FIG. 12 itself illustrating the "Populate Selected Frame With Information Elements" general step of the method in accordance with the present invention illustrated in FIG. 9.
Figure 15:
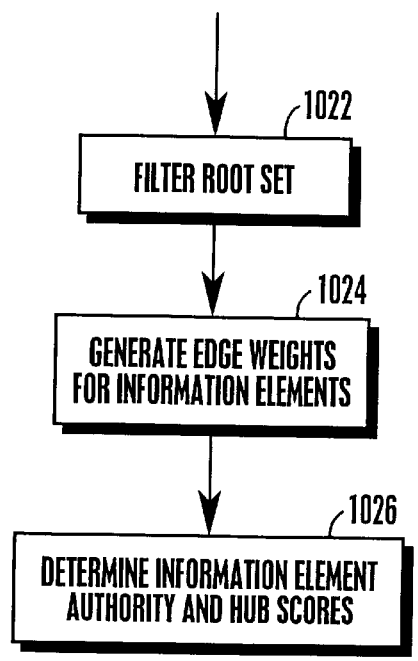
FIG. 15 is a flow diagram illustrating the more specific steps associated with the "Rank Information Elements Of Root Set" step of FIG. 12, FIG. 12 itself illustrating the "Populate Selected Frame With Information Elements" general step of the method in accordance with the present invention illustrated in FIG. 9.

Now referring to FIG. 13, particulars of FIG. 12 can be seen. At block 1014A a search query is formed from frame attributes, and then at block 1014B the query is parsed for search terms. Then, at block 1015 a search is undertaken based on the parsed query, with an initial set of Web pages being returned at block 1015A. Further details can be seen referring to FIG. 14, wherein at block 1016 the links from the elements in the initial set are parsed in accordance with principles discussed above, and at block 1018 the elements that are linked to elements in the initial set are retrieved and combined with the initial set at block 1020 to form the root set. The root set is filtered as discussed above at block 1022 of FIG. 15, with edge weights being generated at block 1024 and authority and hub scores being determined at block 1026. Continuing to FIG. 16, a graph is generated at block 1028 by converting the root set, with the initial edge weights of the graph being generated at block 1030 from the information element link information. Proceeding to block 1032, the weights are modified using an anchor test, other linguistic test, and/or syntactic measures. Global information can be used at block 1034 to further modify the edge weights. Then, referring to FIG. 17 the hub and authority scores for the Web pages are updated at block 1036, and at block 1038 the resulting scores are filtered. Finally, as shown at block 1040 in FIG. 18, the ranked Web pages in the root set are filtered, with the resulting pages in the root set being limited to user-specified hub and authority values.

While this invention has been described in its preferred form, it will be appreciated that changes may be made in the form, procedure and sequences of its various steps and elements without departing from its spirit or scope.

What we claim is:

1. A method for generating a hierarchical representation of information elements, comprising:
   generating a root set of information elements;
   determining at least one eigenvector of at least one similarity matrix; and
   using the eigenvector, undertaking at least one of: ranking the information elements in the root set, and partitioning the root set.

2. The method of claim 1, wherein the act of generating a root set includes generating an initial set using a keyword search, and adding to the initial set information elements that are one link away from any element in the initial set.

3. The method of claim 1, wherein the act of determining at least one eigenvector uses at least one of: a matrix representing hub values, and a matrix representing authority values.

4. The method of claim 1, wherein the act of undertaking at least one ranking and partitioning includes assigning, to at least one scored information element, an authority score and a hub score.

5. The method of claim 4, wherein the information elements are Web pages and the scored information element is a scored Web page, and the method further comprises establishing at least one score associated with the scored Web page based on at least one of: links from the scored page to Web pages at the same Web site as the scored page, links to the scored page from Web pages at the same Web site as the scored page, and the existence of another Web page having a greater number of links to other Web pages than the scored page, the links of the other Web page overlapping in identity with the links of the scored page.

6. The method of claim 4, wherein the information elements are Web pages and the scored information element is a scored Web page, and the method further comprises establishing at least one score associated with the scored Web page based on all of: links from the scored page to Web pages at the same Web site as the scored page, links to the scored page from Web pages at the same Web site as the scored page, and the existence of another Web page having a greater number of links to other Web pages than the scored page, the links of the other Web page overlapping in identity with the links of the scored page.

7. The method of claim 4, wherein at least some links associated with the scored information element are associated with respective hub values, and the hub value of the scored information element depends at least in part on the hub values of the links.

8. A method for generating a hierarchical representation of Web pages, comprising:

identifying an initial set of Web pages;

adding pages to the initial set based on hyperlinks to establish a root set; and assigning hub scores and authority scores to at least some pages in the root set based at least in part on whether a first page in the root set is linked to a second page in the root set when the first and second pages belong to a first Web site.

9. The method of claim 8, wherein the act of assigning is undertaken by determining whether an IP address of the first Web page matches an IP address of the second Web page to a predetermined octet set.

10. The method of claim 9, wherein the first and second Web pages are class A or class B pages, and the predetermined octet set is the two most significant octets.

11. The method of claim 9, wherein the first and second Web pages are class C pages, and the predetermined octet set is the three most significant octets.

12. The method of claim 9, wherein the first and second Web pages are class D pages, and the predetermined octet set is the four most significant octets.

13. The method of claim 8, further comprising assigning hub scores and authority scores to at least some pages in the root set based at least in part on the existence of another Web page having a greater number of links to other Web pages than the scored page, the links of the other Web page overlapping in identity with the links of the scored page.

* * * * *